US008374820B2

(12) United States Patent
Hou

(10) Patent No.: US 8,374,820 B2
(45) Date of Patent: Feb. 12, 2013

(54) TEST CIRCUIT FOR NETWORK INTERFACE

(75) Inventor: Zuo-Lin Hou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 318 days.

(21) Appl. No.: 12/870,992

(22) Filed: Aug. 30, 2010

(65) Prior Publication Data

US 2012/0029860 A1  Feb. 2, 2012

(30) Foreign Application Priority Data

Jul. 28, 2010  (CN) .......................... 2010 1 0239060

(51) Int. Cl.
*G01R 31/28* (2006.01)
(52) U.S. Cl. .................. 702/117; 324/750.02; 370/241; 370/252; 455/67.11; 455/423
(58) Field of Classification Search .................. 702/125, 702/126, 89, 106, 117, 79, 118, 120; 324/750.02, 324/754, 755, 763, 765, 73.1, 74, 158.1; 714/700, 726, 731, 733, 734; 370/241, 242, 370/252, 247, 401, 402; 703/23, 24; 455/67.11, 455/67.16, 423
See application file for complete search history.

(56) References Cited

U.S. PATENT DOCUMENTS

| | | | | |
|---|---|---|---|---|
| 6,570,397 | B2 * | 5/2003 | Mayder et al. | 324/750.02 |
| 7,106,081 | B2 * | 9/2006 | Mayder et al. | 324/750.02 |
| 7,277,395 | B2 * | 10/2007 | Rosen et al. | 370/241 |
| 7,327,687 | B2 * | 2/2008 | Miller et al. | 370/241 |
| 8,116,758 | B2 * | 2/2012 | Mlinarsky et al. | 455/423 |
| 2006/0006896 | A1 * | 1/2006 | Mayder et al. | 324/758 |

* cited by examiner

*Primary Examiner* — Carol Tsai
(74) *Attorney, Agent, or Firm* — Altis Law Group, Inc.

(57) ABSTRACT

A first output pin of a microcontroller is connected to a control pin of a high speed switch chip. A second output pin of the microcontroller is connected to two control pins of first and second switch chips. Two output pins of the high speed switch chip are connected to two input pins of the first switch chip. Two input pins of a third switch chip are connected to two output pins of the second switch chip. Two control pins of the third switch chip are connected to a third output pin of the microcontroller. Three input pins of a bus switch chip are connected to fourth to sixth output pins of the microcontroller. A load board is connected to six output pins of the bus switch chip and four switch pins of the first and second switch chips.

6 Claims, 2 Drawing Sheets

TEST CIRCUIT FOR NETWORK INTERFACE

BACKGROUND

1. Field of the Invention

The present disclosure relates to test circuits, and particularly to a test circuit for testing network interfaces.

2. Description of Related Art

With development of communication technology, Ethernet has been widely used in various fields. Registered Jack-45 (RJ-45) are commonly used by computers as network interfaces to accommodate network standards, such as 10 Mbit/s baseband unshielded twisted pair cable (10Base-T), 100Base-TX, 1000 Mbit/s baseband unshielded twisted pair cable (1000Base-T). Signals transmitted by the RJ-45 network interfaces need to be tested to ensure signal integrity. However, when testing the network interfaces, oscilloscopes and other test devices are needed, this is not only time-consuming and but may decrease the precision of test measurement. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
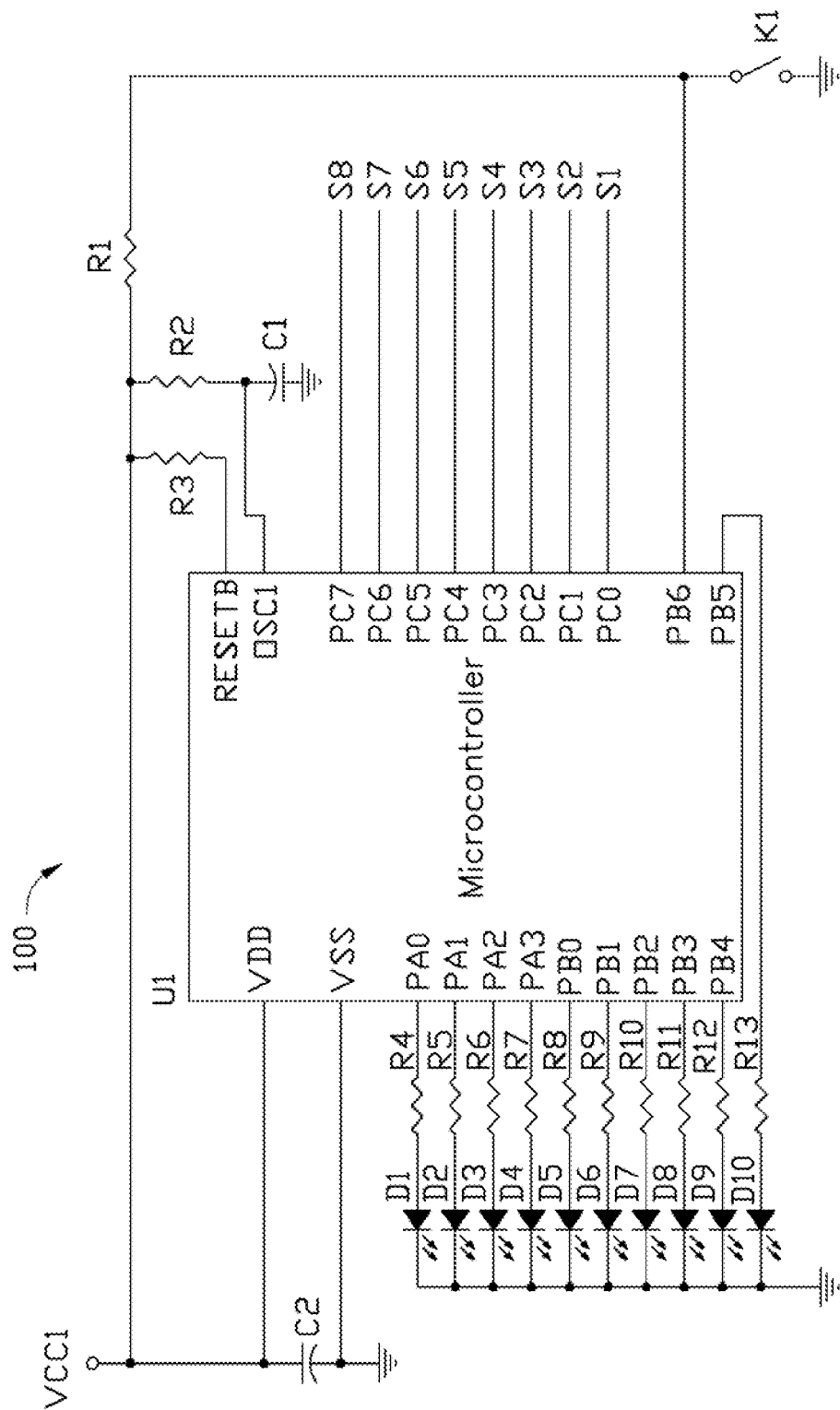
FIGS. 1 and 2 are a circuit diagram of an embodiment of a test circuit for network interfaces.
Figure 2:
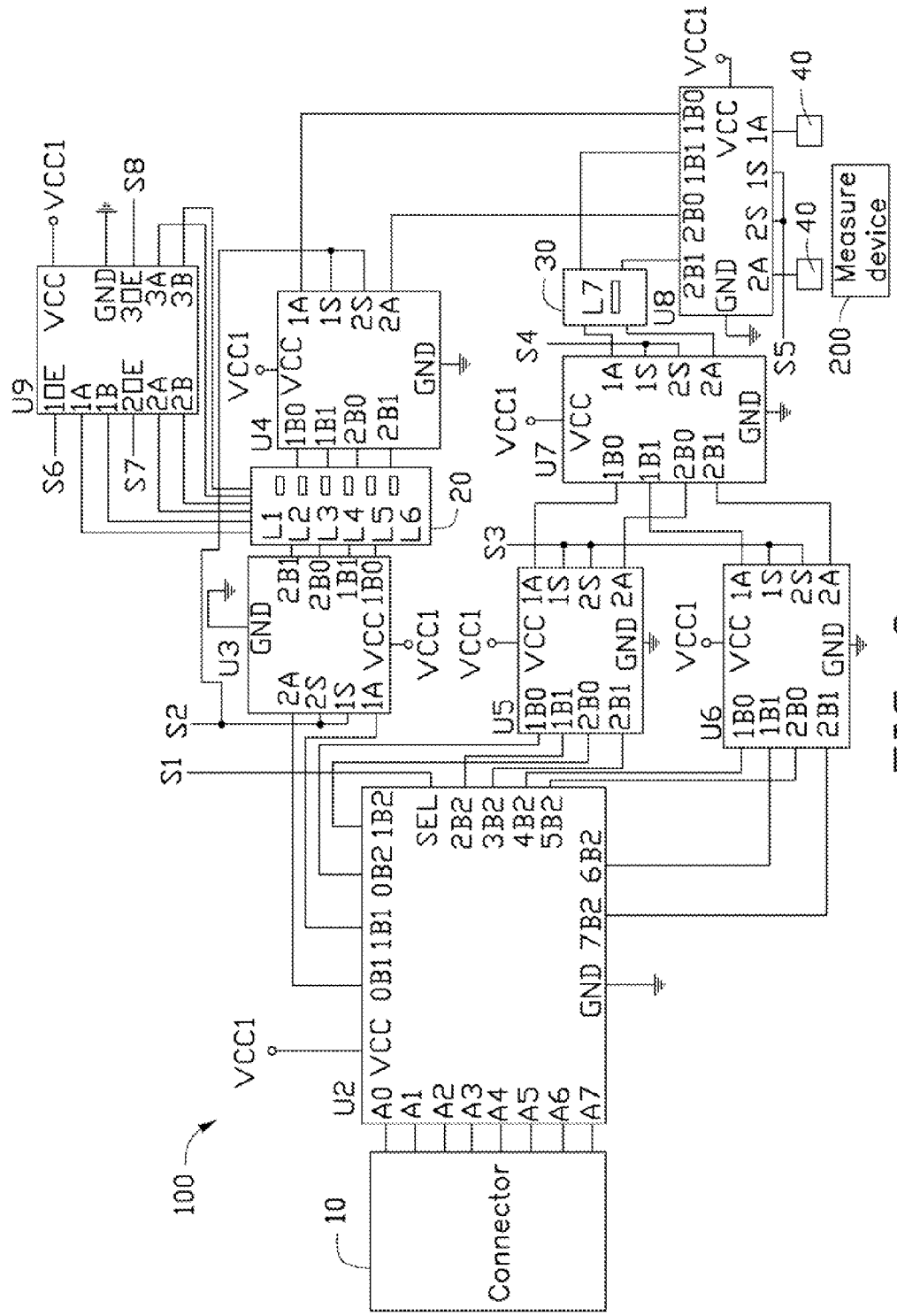

Referring to FIGS. 1 and 2, a test circuit 100 is used for testing network interfaces of an electronic device, such as a motherboard of a computer. The test circuit 100 in accordance with an exemplary embodiment includes a connector 10, two probes 40, a microcontroller U1, a high speed switch chip U2, switch chips U3-U8, a bus switch chip U9, two load boards 20 and 30, a switch K1, resistors R1-R13, capacitors C1 and C2, and a plurality of light emitting diodes (LEDs), such as ten LEDs D1-D10. The connector 10 is used as an interface to electrically connect to a network interface of the motherboard of the computer. The probes 40 are used as connectors to a measuring device 200, such as an oscillograph. In one embodiment, the switch K1 is a button switch. A type of the microcontroller U1 is MK7A20P. A type of the high speed switch chip U2 is MAX4892E. Types of the switch chips U3-U8 are FSA2267. A type of the bus switch chip U9 is SN74CBTLV3125. The load board 20 sets first to sixth loads L1-L6. Values of the first to sixth loads L1-L6 are selected according to need. The load board 30 sets a seventh load L7, and the seventh load L7 is a resistor.

An output pin PC0 of the microcontroller U1 is connected to a control pin SEL of the high speed switch chip U2. Input pins A1-A7 of the high speed switch chip U2 are respectively connected to pins of the connector 10. A voltage pin VCC of the high speed switch chip U2 is connected to a power source VCC1. Output pins 0B1 and 1B1 of the high speed switch chip U2 are respectively connected to input pins 2A and 1A of the switch chip U3. Control pins 1S and 2S of the switch chip U3 are connected to an output pin PC1 of the microprocessor U1. Switch pins 1B0 and 2B0 of the switch chip U3 are respectively connected to two terminals of the first to third loads L1-L3. Switch pins 1B1 and 2B1 of the switch chip U3 are respectively connected to two terminals of the fourth to sixth loads L4-L6.

Control pins 1S and 2S of the switch chip U4 are connected to the output pin PC1 of the microcontroller U1. Switch pins 1B0 and 2B0 of the switch chip U4 are respectively connected to two terminals of the first to third loads L1-L3. Switch pins 1B1 and 2B1 of the switch chip U4 are respectively connected to two terminals of the fourth to sixth loads L4-L6. Output pins 1A and 2A of the switch chip U4 are respectively connected to input pins 1B0 and 2B0 of the switch chip U8. Control pins 1S and 2S of the switch chip U8 are connected to an output pin PC4 of the microcontroller U1. Output pins 1A and 2A of the switch chip U8 are respectively connected to the probes 40.

Output pins 0B2, 1B2, 2B2, and 3B2 of the high speed switch chip U2 are respectively connected to input pins 1B0, 2B0, 1B1, and 2B1 of the switch chip U5. Control pins 1S and 2S of the switch chip U5 are connected to an output pin PC2 of the microcontroller U1. Output pins 1A and 2A of the switch chip U5 are respectively connected to input pin 1B0 and 2B0 of the switch chip U7. Control pins 1S and 2S of the switch chip U7 are connected to an output pin PC3 of the microcontroller U1. Output pins 1A and 2A of the switch chip U7 are respectively connected to two terminals of the load L7, and also respectively connected to output pins 1B1 and 2B1 of the switch chip U8. Output pins 4B2, 5B2, 6B2, and 7B2 of the high speed switch chip U2 are respectively connected to input pins 1B0, 2B0, 1B1, and 2B1 of the switch chip U6. Control pins 1S and 2S of the switch chip U6 are connected to an output pin PC2 of the microcontroller U1. Output pins 1A and 2A of the switch chip U6 are respectively connected to input pins 1B1 and 2B1 of the switch chip U7. Voltage pins VCC of the switch chips U3-U8 are connected to the power source VCC1. Ground pins GND of the switch chips U3-U8 are grounded.

A voltage pin VCC of the bus switch chip U9 is connected to the power source VCC1. Input pins 1OE, 2OE, and 3OE of the bus switch chip U9 are respectively connected to output pins PC5, PC6, and PC7 of the microcontroller U1. Output pins 1A and 1B of the bus switch chip U9 are respectively connected to two terminals of the first to sixth loads L1-L6. Output pins 2A and 2B of the bus switch chip U9 are respectively connected to two terminals of the first to sixth loads L1-L6. Output pins 3A and 3B of the bus switch chip U9 are respectively connected to two terminals of the first to sixth loads L1-L6. A ground pin GND of the bus switch chip U9 is grounded. An output pin PB6 of the microcontroller U1 is grounded through the switch K1, and also connected to the power source VCC1 through the resistor R1. A voltage pin RESETB of the microcontroller U1 is connected to the power source VCC1 through the resistor R3. A clock pin OSC1 of the microcontroller U1 is connected to the power source VCC1 through the resistor R2. The capacitor C2 is connected between the clock pin OSC1 of the microcontroller U1 and ground. A voltage pin VDD of the microcontroller U1 is connected to the power source VCC1. The capacitor C2 is connected between the voltage pin VDD of the microcontroller U1 and ground. A ground pin VSS of the microcontroller U1 is grounded. Output pins PA0-PA3, PB0-PB5 of the microcontroller U1 are respectively connected to anodes of the LEDs D1-D10 through the resistors R4-R13 respectively. Cathodes of the LEDs D1-D10 are grounded.

In one embodiment, the network interface of the motherboard is a Registered Jack-45 (RJ-45) network interface. The RJ-45 network interface can support three kinds of network standards, such as 10 Mbit/s baseband unshielded twisted pair cable (10Base-T), 100Base-TX, and 1000 Mbit/s baseband unshielded twisted pair cable (1000Base-T). A first group output signals of the network standard 10Base-T and a second group output signals of the network standard 100Base-TX and 1000Base-T need to be tested.

Before testing of the network standard 10Base-T, the test circuit 100 is connected to a network interface of the motherboard by the connector 10 and connected to an oscillograph by the probes 40. The test circuit 100 can work when the switch K1 is pressed. When the output pin PC0 of the microcontroller U1 outputs a low level signal to the control pin SEL of the high speed switch chip U2, the output pins 0B1 and 1B1 of the high speed switch chip U2 are respectively connected to the input pins 1A and 2A of the switch chip U3. At the same time, the output pin PC1 of the microcontroller U1 outputs a low level signal to the control pins 1S and 2S of the switch chips U3 and U4. The output pins 1B0 and 2B0 of the switch chips U3 and U4 are connected together and also connected to the load board 20. When the output pin PC5 of the microcontroller U1 outputs a low level signal to the input pin 1OE of the bus switch chip U9, and the output pins PC6 and PC7 of the microcontroller U1 output high level signals to the input pins 2OE and 3OE of the bus switch chip U9, the output pins 1A and 1B of the bus switch chip U9 are connected together. The first load L1 of the load board 20 is used for a first test. The input pins 1B0 and 2B0 of the switch chip U8 are respectively connected to the output pins 1A and 2A of the switch chip U4. The output pin PC4 of the microcontroller U1 outputs a low level signal to the control pins 1S and 2S of the switch chip U8. The output pins 1A and 2A of the switch chip U8 outputs a signal, which passes through the first load L1, to the oscillograph through the probes 40 to be displayed.

After the first test is completed, the output pins PC6 of the microcontroller U1 outputs a low level signal to the input pin 2OE of the bus switch chip U9, the output pins PC5 and PC7 of the microcontroller U1 output high level signals to the input pins 1OE and 3OE of the bus switch chip U9, the output pins 2A and 2B of the bus switch chip U9 are connected together. The second load L2 of the load board 20 is used for a second test. When the output pins PC7 of the microcontroller U1 outputs a low level signal to the input pin 3OE of the bus switch chip U9, and the output pins PC5 and PC6 of the microcontroller U1 output high level signals to the input pins 1OE and 2OE of the bus switch chip U9, the output pins 3A and 3B of the bus switch chip U9 are connected together. The third load L3 of the load board 20 is used for a third test.

After the above tests are completed, the output pin PC1 of the microcontroller U1 outputs a high level signal to the control pins 1S and 2S of the switch chips U3 and U4. The output pins 1B1 and 2B1 of the switch chips U3 and U4 are connected together and also connected to the load board 20. The output pins PC5 of the microcontroller U1 outputs a low level signal to the input pin 1OE of the bus switch chip U9, and the output pins PC6 and PC7 of the microcontroller U1 output high level signals to the input pins 2OE and 3OE of the bus switch chip U9. The output pins 1A and 1B of the bus switch chip U9 are connected together. The fourth load L4 of the load board 20 is used for a fourth test. When the output pins PC6 of the microcontroller U1 outputs a low level signal to the input pin 2OE of the bus switch chip U9, and the output pins PC5 and PC7 of the microcontroller U1 output high level signals to the input pins 1OE and 3OE of the bus switch chip U9. The output pins 2A and 2B of the bus switch chip U9 are connected together. The fifth load L5 of the load board 20 is used for a fifth test. When the output pin PC7 of the microcontroller U1 outputs a low level signal to the input pin 3OE of the bus switch chip U9, and the output pins PC5 and PC6 of the microcontroller U1 output high level signals to the input pins 1OE and 2OE of the bus switch chip U9. The input pins 3A and 3B of the bus switch chip U9 are connected together. The sixth load L6 of the load board 20 is used for a sixth test. The test circuit 100 completes the signals integrity test of the network standard 10Base-T after the sixth load L6 of the load board 20 is tested.

When the test circuit 100 tests signals of network standard 100Base-T and 1000Base-T, the output pin PC0 of the microcontroller U1 outputs a high level signal to the control pin SEL of the high speed switch chip U2, to switch the test circuit 100 to test signals of the network standard 100Base-T and 1000Base-T. When the output pin PC2 of the microcontroller U1 outputs a low level signal to the control pins 1S and 2S of the switch chips U5 and U6, the output pins 0B2 and 1B2 of the high speed switch chip U2 are respectively connected to the input pins 1B0 and 2B0 of the switch chip U5. The output pins 4B2 and 5B2 of the high speed switch chip U2 are respectively connected to the input pins 1B0 and 2B0 of the switch chip U6. When the output pin PC3 of the microcontroller U1 outputs a low level signal to the control pins 1S and 2S of the switch chip U7, the input pins 1B0 and 2B0 of the switch chip U7 are connected together, and the output pins 1A and 2A of the switch chip U7 are connected to the seventh load L7 of the load board 30 and also connected to the input pins 1B1 and 2B1 of the switch chip U8. The output pin PC4 of the microcontroller U1 outputs a low level signal to the control pins 1S and 2S of the switch chip U8. The output pins 1A and 2A of the switch chip U8 output a signal, which passes through the seventh load L7, to the oscillograph through the probes 40 to be displayed.

When the output pin PC2 of the microcontroller U1 outputs a high level signal to the control pins 1S and 2S of the switch chips U5 and U6, the output pins 2B2 and 3B2 of the high speed switch chip U2 are respectively connected to the input pins 1B1 and 2B1 of the switch chip U5. The output pin 6B2 and 7B2 of the high speed switch chip U2 are respectively connected to the input pins 1B1 and 2B1 of the switch chip U6. When the output pin PC3 of the microcontroller U1 outputs a low level signal to the control pins 1S and 2S of the switch chip U7, the input pin 1B0 and 2B0 of the switch chip U7 are connected together, and the output pins 1A and 2A of the switch chip U7 is connected to the seventh load L7 and also respectively connected to the input pins 1B1 and 2B1 of the switch chip U8. The output pin PC4 of the microcontroller U1 outputs a low level signal to the control pins 1S and 2S of the switch chip U8, the output pins 1A and 2A of the switch chip U8 output a signal, which passes through the load L7, to the oscillograph through the probes 40 to be displayed.

When the output pin PC2 of the microcontroller U1 outputs a low level signal to the control pins 1S and 2S of the switch chips U5 and U6, the output pins 0B2 and 1B2 of the high speed switch chip U2 are respectively connected to the input pins 1B0 and 2B0 of the switch chipU5. The output pins 4B2 and 5B2 of the high speed switch chip U2 are respectively connected to the input pins 1B0 and 2B0 of the switch chip U6. When the output pin PC3 of the microcontroller U1 outputs a high level signal to the control pins 1S and 2S of the switch chip U7, the input pins 1B1 and 2B1 of the switch chip U7 are connected together, and the output pins 1A and 2A of the switch chip U7 are connected to the seventh load L7 and also respectively connected to the input pins 1B1 and 2B1 of the switch chip U8. The output pins PC4 of the microcontroller U1 output a low level signal to the control pins 1S and 2S of the switch chip U8. The output pins 1A and 2A of the switch chip U8 output a signal, which passes through the seventh load L7, to the oscillograph through the probes 40 to be displayed.

When the output pin PC2 of the microcontroller U1 outputs a high level signal to the control pins 1S and 2S of the switch chips U5 and U6, the output pins 2B2 and 2B2 of the high speed switch chip U2 are respectively connected to the input pins 1B1 and 2B1 of the switch chip U5. The output pins 6B2 and 4B2 of the high speed switch chip U2 are connected to the input pins 1B1 and 2B1 of the switch chip U6. When the output pin PC3 of the microcontroller U1 outputs a high level signal to the control pins 1S and 2S of the switch chip U7, the input pins 1B1 and 2B1 of the switch chip U7 are connected together, and output pins 1A and 2A of the switch chip U7 are connected to the seventh load L7 and also respectively connected to the input pins 1B1 and 2B1 of the switch chip U8. The output pin PC4 of the microcontroller U1 outputs a low level signal to the control pins 1S and 2S of the switch chip U8. The output pins 1A and 2A of the switch chip U8 output a signal, which passes through the seventh load L7, to the oscillograph through the probes 40 to be displayed.

In one embodiment, the test circuit 100 tests six work states of the network standard 10Base-T, and tests four work states of the network standard 100Base-TX or 1000Base-T. The LEDs D1-D10 are configured to display the ten work states, which six are work states of the network standard 10Base-T, and four are either work states of the network standard 100Base-TX or 1000Base-T. If the test passes, a corresponding LED is lit, if the test does not pass, the corresponding LED does not light.

The test circuit 100 can automatically test signal integrity of the transmitted signals by different network standard. Thus, the test circuit 100 is convenient to use.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A test circuit for testing a network interface, the test circuit comprising:
a connector connected to the network interface;
two probes connected to a measuring device;
a first load board;
first to third switch chips, two output pins of the second switch chip connected to first and second input pins of the third switch chip, two output pins of the third switch chip connected to the probes, first to fourth switch pins of each of the first and second switch chips connected to the first load board;
a bus switch chip, first to sixth output pins of the bus switch chip connected to the first load board;
a high speed switch chip, first to seventh input pins of the high speed switch chip connected to pins of the connector, first and second output pins of the high speed switch chip connected to two input pins of the first switch chip; and
a microcontroller, a first output pin of the microcontroller connected to a control pin of the high speed switch chip, two control pins of the first and second switch chips connected to a second output pin of the microcontroller, two control pins of the third switch chip connected to a third output pin of the microcontroller, first to third input pins of the bus switch chip connected to fourth to sixth output pins of the microcontroller;
wherein the microcontroller and the high speed switch chip output control signals to selectively control the first and second switch chips and the bus switch chip to turn on, to connect different loads of the first load board to the test circuit, the microcontroller outputs a control signal to control the third switch chip to turn on by the second switch chip, to display a test result through the measuring device.

2. The test circuit as claimed in claim 1, further comprising fourth to sixth switch chips and a second load board, wherein third to sixth output pins of the high speed switch chip are connected to first to fourth switch pins of the fourth switch chip, two control pins of the fourth switch chip are connected to a seventh output pin of the microcontroller, two output pins of the fourth switch chip are connected to first and second input pins of the fifth switch chip, two control pins of the fifth switch chip are connected to an eighth output pin of the microcontroller, two output pins of the fifth switch chip are connected to the second load board, third and fourth switch pins of the third switch chip are connected to the second load board, seventh to tenth output pins of the high speed switch chip are connected to first to fourth input pin of the sixth switch chip, two control pins of the sixth switch chip are connected to the seventh output pin of the microcontroller, two output pins of the sixth switch chip are connected to third and fourth input pins of the fifth switch chip, the microcontroller and high speed switch chip output control signals to selectively control the fourth and fifth switch chips to turn on, and control the sixth switch chip to turn on, to connect a load of the second load board to the test circuit, to display the measure result to the measure device when the third switch chip is turned on.

3. The test circuit as claimed in claim 2, wherein the first load board comprises first to sixth loads, first and second switch pins of the first switch chip are connected to two terminals of the first to third loads, the third and fourth switch pins of the first switch chip are connected to two terminals of the fourth to sixth loads, first and second output pins of the bus switch chip are connected to two terminals of the first to sixth loads, third and fourth output pins of the bus switch chip are connected to two terminals of the first to sixth loads, fifth and sixth output pins of the bus switch chip are connected to two terminals of the first to sixth loads, the second load board comprises a seventh load, output pins of the sixth switch chip are connected to two terminals of the seventh load.

4. The test circuit as claimed in claim 2, further comprising a switch, first to third resistors, and first and second capacitors, wherein a ninth output pin of the microcontroller is grounded through the switch, and also connected to the power source through the first resistor, a first voltage pin of the microcontroller is connected to the power source through the second resistor, a clock pin of the microcontroller is connected to the power source through the third resistor, the first capacitor is connected between the clock pin of the microcontroller and ground, the second capacitor is connected between the second voltage pin of the microcontroller and ground.

5. The test circuit as claimed in claim 4, further comprising first to tenth light emitting diodes (LEDs), and fourth to thirteen resistors, wherein ninth to seventeen output pins of the microcontroller are connected to anodes of the first to tenth LEDs through the fourth to thirteen resistors respectively, cathodes of the first to tenth LEDs are grounded.

6. The test circuit as claimed in claim 1, wherein the switch is a button switch.

* * * * *